Jan. 26, 1954 J. H. OSWALD ET AL Re. 23,775

PANEL CLOSURE

Original Filed July 20, 1946 2 Sheets-Sheet 1

INVENTORS
J. H. Oswald
and F. G. Oswald
BY Ray A. Sehr
ATTORNEY

PANEL CLOSURE

Original Filed July 20, 1946 2 Sheets-Sheet 2

INVENTORS
J. H. Oswald
and F. G. Oswald
BY Ray A. Lehr
ATTORNEY

Reissued Jan. 26, 1954

Re. 23,775

UNITED STATES PATENT OFFICE 23,775

PANEL CLOSURE

Joseph H. Oswald and Frederick G. Oswald,
South Euclid, Ohio

Original No. 2,583,439, dated January 22, 1952, Serial No. 685,262, July 20, 1946. Application for reissue February 2, 1953, Serial No. 334,770

15 Claims. (Cl. 20—55)

Matter enclosed in heavy brackets [ ] appears in the original patent but forms no part of this reissue specification; matter printed in italics indicates the additions made by reissue.

The invention relates to panel closures such as windows and doors of buildings and is especially applicable to auxiliary panel structures such as storm windows and doors and combination storm-and-screen windows and doors.

Under the common prior practice it has been necessary to fit the sash part of such auxiliary windows to the window frame "on the job" because of lack of uniformity in window frame design, of dimensional variations due to faulty workmanship, of swelling or shrinkage of wood construction, and the like. Such fitting "on the job" has usually been necessary also in the case of storm and combination doors. As a consequence, installation of such windows and doors usually has required the services of a carpenter and of a painter, so that the installation expense has constituted a very considerable part of the total installed cost to the purchaser and that total cost has been unduly large.

The chief object of the present invention is to provide an improved panel and adaptor structure that can be installed in the cased openings of buildings by unskilled labor without material structural modification of either the panel or casing structures, so that the panel, including painting, can be completely fabricated to final form in the factory, and by efficient methods, with resultant lowering of both fabrication and installation expense.

Another object of the invention is to provide an auxiliary window construction of the character specified which is pleasing in appearance and can be installed without modifying the architectural lines or appearance of the main window design.

A further object of the invention, more or less ancillary to those stated above, is to provide for use with panel closures, adaptor means or devices that are structurally simple and inexpensive and susceptible of use with standard or conventional types of panel closures, such as storm doors and storm or screen window sashes, to adapt such panel structures of standard dimensions to casing openings that may depart substantially in form and dimensions from their nominal sizes.

An additional object of the invention is to provide a storm type of window capable of providing a high degree of thermal insulation but having also effective provision for drainage of moisture which may in any way find access to the air space between the main and auxiliary window panels.

With the above objects in view the invention consists in forms, arrangements and combinations of structural parts hereinafter exemplified and explained, in connection with preferred embodiments shown in the accompanying drawings and defined in the claims. Panel structures of the storm window type embodying the improvements have been chosen for explanatory description and illustration as they represent all aspects of the invention.

In the drawings, where throughout like reference numerals designate like parts,

Figure 1:
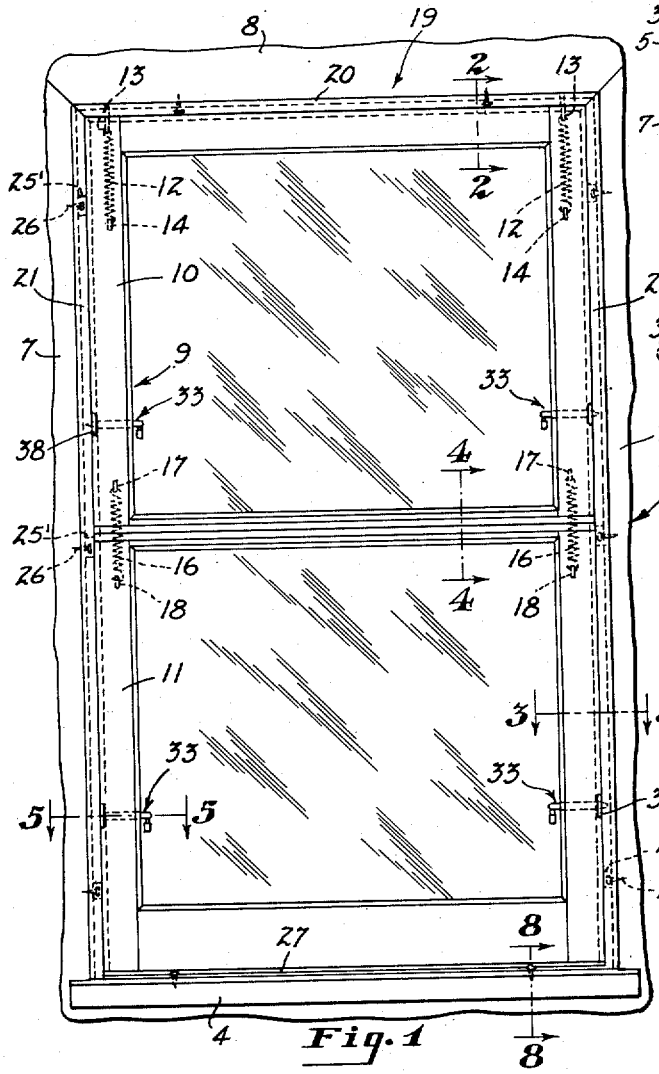
Fig. 1 is an outside (i. e. outdoors) elevation of a storm window and adjacent window casing parts embodying the present invention.
Figure 6:
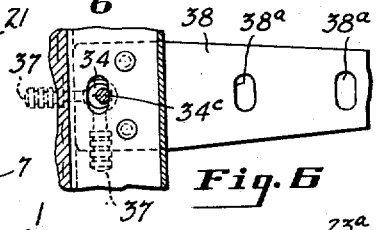
Fig. 6 is a section on the line 6—6 of Fig. 5.
Figure 7:
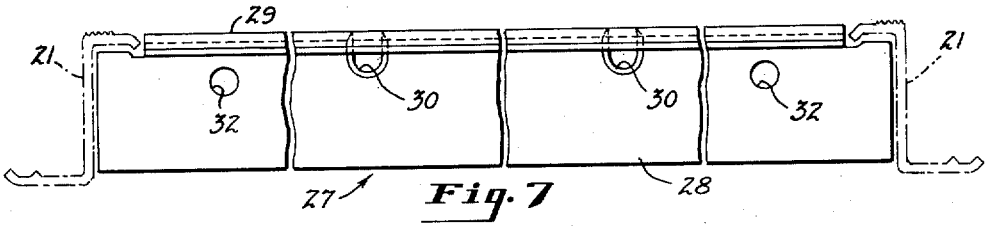
Fig. 7 is a detached enlarged plan view of the adaptor and weather seal device mounted on the sill of the casing structure, as shown in Fig. 1, parts of the structure being broken away to permit the enlarged showing.
Figure 8:
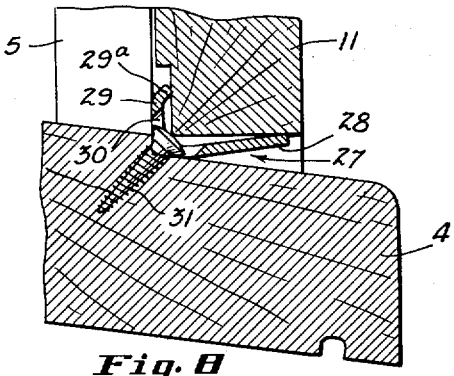
Fig. 8 is an enlarged fragmentary vertical section on the line 8—8 of Fig. 1.

Referring now in detail to the several structures illustrated and first to the constructions shown in Figs. 1 to 8a the reference character 1 designates as an entirety a conventional window frame or casing structure of wood comprising upright or stile parts 2, 2 (Fig. 3), a head 3 (Fig. 2) and a sill 4 (Figs. 1 and 8). The casing structure further includes upright blind stops 5, 5 and transverse blind stop 6. The window casing is provided with outside trim members 7, 7 and 8. A similar casing structure is more fully shown in United States Patent No. 2,372,792 to which reference may be made for further details of the construction.

In the opening of the casing structure is mounted a wood sash structure 9 which may be of either the single panel or double panel type but the latter is shown, with an upper panel 10 and a lower panel 11. The upper panel 10 is attached to the casing structure by coil springs 12 which are carried by hooks 13 mounted in the transverse stop member 6 (Figs. 1 and 2) and at their lower ends are attached to screw eyes 14 carried by panel 10. The lower rail of upper panel 10 and the upper rail of lower panel 11 are fitted with metal tongue and groove channel members 15, 15. The lower panel 11 is yieldingly supported from the upper panel 10 by means of coil springs 16, 16 which at their upper ends engage hooks 17, 17 carried by panel 10, and at their lower ends engage screw eyes 18, 18 carried by panel 11. This construction provides a weather-tight joint between the two sash panels and permits their pivotal or swinging movement in relation to each other. The sash construction shown is similar to that shown in U. S. Patent 2,372,792 and is there fully described. As is disclosed in the patent, the lower sash panel may either be glazed or a similar sash fitted with an insect screen may be substituted to provide the well known combination storm-and-screen window type of construction.

In prior practice, as typified in U. S. Patent 2,372,792, it has been customary to fit the storm or screen sash panels directly to the wood window casing structure of the building. As has been noted above, the dimensional variations in window casings by way of departure from the standard dimensions and by reason of swelling, contraction and warping of the wooden structures has necessitated the fitting of storm windows after they are delivered on the premises of the purchasers; and this has involved the services of carpenters and painters "on the job" with resultant high cost of installation. To overcome these difficulties the present invention provides adaptor means preferably in the form of an inverted U-shaped frame formed of metal strips of novel design.

Figure 2:
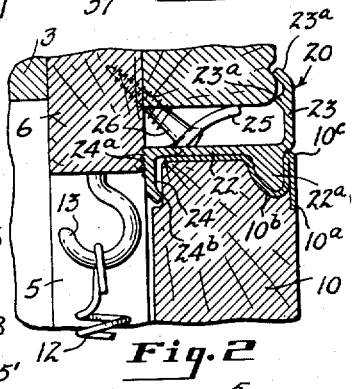
Fig. 2 is an enlarged vertical section taken on the line 2—2 of Fig. 1.

In the drawings the numeral 19 designates the adaptor frame as an entirety. Said frame comprises a head strip 20 and upright strips 21, 21 which are preferably welded or brazed to the ends of the head strip to form an integral frame structure. As shown in Fig. 2, the head strip 20 comprises a web section 22 having a depending tongue or bead 22a, a flange 23 extending outwardly (i. e. upwardly) from the outside edge of the web 22 and a flange 24 extending inwardly (i. e. downwardly) from the inside edge of the web 22. Preferably the inner side of flange 23 is formed with two parallel sharp-cornered ribs 23a to engage the window casing and the flange 24 is formed with a plurality of smaller sharp ribs 24a to engage the blind stop and has its free edge bent at an angle of about 45° to provide a sharp corner 24b to engage the surface of the sash. In addition the web section 22 is provided with bendable lugs 25 which can be die formed integral with the web section. For a reason which will later appear, lugs 25 extend outward at an inclination to the web and toward flange 23. For cooperation with strip 22 the sash panel is fitted at its upper end with a rolled sheet metal strip 10a formed with a groove 10b to fit tongue 22a, the tongue and groove being shaped so that the panel 10 can swing outward, about an axis formed by edge 10c of strip 10a. This action is more fully explained in U. S. Patent 2,372,792.

The upright frame strips 21, 21 have webs 22' and flanges 23 and 24 and lugs 25', and are generally similar to strip 20 except that the tongue or bead 22a of strip 20 is omitted in the case of strips 21, 21 and the lugs 25' of the latter are longer than those of strip 20.

Figure 3:
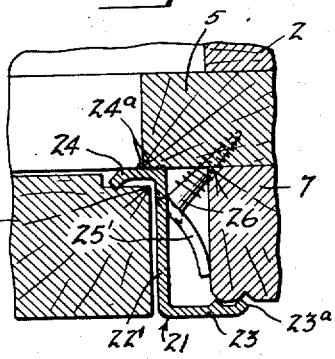
Fig. 3 is an enlarged horizontal section taken on the line 3—3 of Fig. 1.
Figure 4:
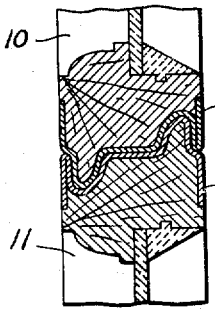
Fig. 4 is a vertical section on the line 4—4 in Fig. 1.

The lugs 25 and 25' of frame 19 are apertured to receive screws 26 which serve to attach the frame 19 to the window casing structure with one or both of the sharp cornered ribs 23a engaging the members 7 and 8 of the window casing, while the sharp edge or rib 24b of the adaptor frame is exposed for engagement with the window sash elements, as shown in Figs. 2 and 3. In mounting the frame 19 in the window casing it is desirable, after the frame is positioned in the casing, to tap the flange 23 of the frame with a hammer or mallet to insure some embedment of the sharp ribs 23a and 24a in the wood of the casing structure. When the screws 26 are applied there is some tendency for the resultant stress applied through the lugs 25 to cant or distort the frame, but this is resisted and prevented by the engagement of ribs 24a with the casing. The terminal surface of the marginal rib 23a lies at an angle of about 45° to the adjacent face of the casing (Fig. 3a) and this facilitates repainting of the building because the resultant angle draws the applied paint into the joint.

While the frame strips 20 and 21 can be formed of various metals and can be fabricated in various ways, as for example by rolling, we prefer to extrude them, using a metal, such as aluminum alloy, suitable for that method. The integral lugs 25 and 25' are made by a die forming operation on the extruded strips.

Figure 8A:
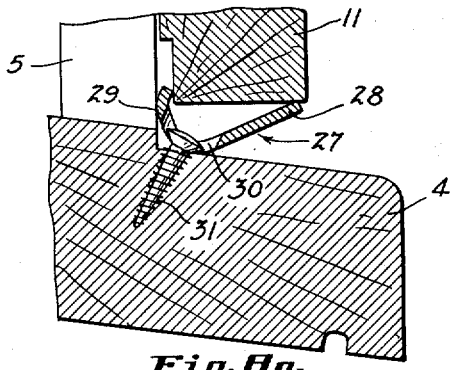
Fig. 8a is a view similar to Fig. 8 showing the positioning of the sill-mounted adaptor and seal device to accommodate a casing opening larger vertically than the casing opening shown in Fig. 1 and Fig. 8.

At the bottom of the sash and casing structures sill-supported adaptor means is provided in the form of a rocker closure or seal member 27. This member is in the form of an angle bar having one arm 28 thereof disposed between the lower edge of the sash member 11 and the upper surface of the window sill 4 (Fig. 8). The other arm 29 of the bar 27 is upturned to engage the inner surface of the sash member 11, and preferably has its free edge 29a bent outward as shown so that its sharp corner engages the surface of the sash. The juncture between the arms 28 and 29 of the bar 27 is curved on a relatively large radius and the bar is formed with a series of apertures 30 elongated transversely of the bar to receive attaching screws 31. With the rounded conformation of the bar 27 and with the attaching screws 31 incompletely screwed home in the elongated apertures 30 the bar is afforded a loose attachment so that when the sash member 11 is moved inward into engagement with the flange 24 of the adaptor frame 19 the bar 27 is given a rolling movement on the sill and the outer longitudinal edge of the arm 28 of the bar is lifted into firm engagement with the bottom surface of sash member 11. Furthermore the bar 27 thus formed and mounted is adapted to close the space between the bottom edge of the sash and the upper surface of the sill 4 notwithstanding considerable variation in the clearance between those two parts. Thus if the clearance is relatively small the attaching screws 31 can be applied as shown in Fig. 8 so that the rounded longitudinally extending corner of the angle will be held relatively close to the adjacent outwardly facing shoulder of the sill member 4; while if the clearance between the sill and the sash is relatively large the attaching screws can be fitted as shown in Fig. 8a so that the bar 27 will have freedom to swing through a larger angle when the bottom sash member is brought into normal position as shown in Fig. 8a. *This large range of angular movement is facilitated by the above described form of arm 29 of the bar with its free edge part extending laterally in the direction of the arm 28.*

The elongated attaching holes 30 of bar 27 will ordinarily afford drainage between the sash and sill members but the bar may also be provided with weep-holes 32 as shown in Fig. 7. The arm 29 of the bar 27 is made shorter than the arm 28 so that the former can swing inwardly between the inner edges of the flanges 24 of the sides 21 of the adaptor frame while the extending ends of the longer arm 28 will fit closely adjacent the web sections 22 of the adaptor frame parts 21, 21.

The rocker bar 27 also can be extruded of aluminum alloy and by suitable choice or treatment of the metal the formed parts can be given a suitable degree of hardness and resilience.

Figure 5:
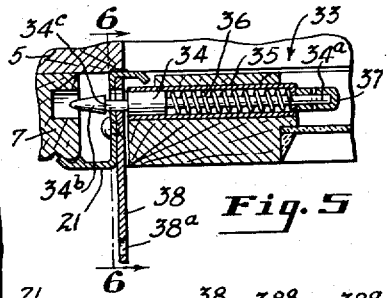
Fig. 5 is a section on the line 5—5 of Fig. 1.

The sash and adaptor frame structure are provided with suitable locking means 33, 33 for holding the sash panels in closed position and various open positions, each sash panel having two of the locks. As shown in Figs. 5 and 6, each lock comprises a bolt 34 slidably mounted in a tubular case 35 which is pressed into a hole in the upright sash member. The bolt has a section 34a of reduced diameter throughout the major part of its length to accommodate a coil spring 36 which at one end engages a shoulder of the bolt 34 and at its other end engages the inturned end of the case 35 so as normally to press the bolt outward as far as is permitted by the operating handle 37 which is secured by a pin on the reduced end of the bolt. The part of the bolt 34 which projects from the open end of the case 35 comprises a tapered end 34b and, intermediate said end and the main body of the bolt, is an eccentric neck portion 34c. The lock further includes a keeper 38 riveted to the adaptor strips 21 and having a series of holes 38a to receive the projecting end of bolt 34.

In the operation of the bolts the tapered end 34b facilitates entrance of the bolt into the keeper holes 38a, under the urging of spring 36. When the bolt has fully entered the innermost of the keeper holes it can be rotated by turning the handle 37 downward from a horizontal position to the full line position shown in Fig. 6 so that the eccentric neck 34c of the bolt forces the window panel inward against the flange 24 of the adaptor frame to effect a tight closure.

The manner in which the sash structure 9 and the adaptor [casing] *frame* are assembled or mounted in the window casing structure will readily be understood from the foregoing description. The sash structure having been provided of a size somewhat smaller than would correspond to the nominal size of the window casing and with the adaptor frame 19 manufactured to properly fit the sash structure and the adaptor and seal member 27 having been provided of a length to fit the adaptor frame, the first step in the mounting of the parts in the window casing is to adjust the locating lugs 25 and 25′ of the said frame member so that the adaptor casing will be centered laterally in the window casing opening and the lower ends of the frame bars 21, 21 will be positioned suitably close to the upper surface of the sill 4. With the adaptor frame formed of malleable metal its lugs 25, 25′ can readily be bent with a hammer, or preferably by simply forcing the adaptor frame into the window casing opening, to effect the desired adjustment and positioning. When this has been done the adaptor frame is firmly attached to the window casing structure by the securing screws 26, 26, preferably after tapping the sharp ribs 23a, 24a of the frame into slightly embedded engagement with the wood casing. These ribs are adapted to penetrate the wood of trim strips 7 and 8 more or less to compensate for small variations of the strips from standard thickness.

The sash structure 9 can now be mounted in the adaptor frame by screwing the suspension hooks 13 into the transverse screen stop 6 and attaching to them the suspension springs 12, 12 of the upper sash member 10. Thereupon the lower sash member may be mounted by attaching the upper ends of springs 16 to suspension hooks 17 carried by the upper sash member 10.

The clearance between the bottom edge of the lower sash member 11 and the upper surface of the window sill 4 is now determined and the adaptor and seal member 27 can be suitably mounted on the window sill as previously described so that when the lower sash member is swung from an open position into vertical alignment with the closed top sash member the outer edge of the part 28 of the rocker 27 will be forced upward into firm engagement with the lower edge of sash member 11 (Figs. 8, 8a) so as to effectively close the clearance between the bottom of the sash and the top surface of the sill. [The firm engagement of rocker 27, throughout its length, with the bottom of the sash structure is facilitated by resilient yielding of the rocker bar.] *The firm engagement of rocker 27 throughout its length with the bottom edge of the sash structure is ensured, even if the sash edge be somewhat out of true with the sill, by the resilient yielding of the rocker bar and by the fact that the lateral pressure of the sash when firmly closed is transmitted through the upstanding arm 29 of the bar directly to its laterally extending arm 28 at all transverse sections throughout the entire length of the rocker bar.*

The above described construction of the panel closure is such that one person working alone and entirely outside a building, can rapidly and easily install a window or door.

Figure 3A:
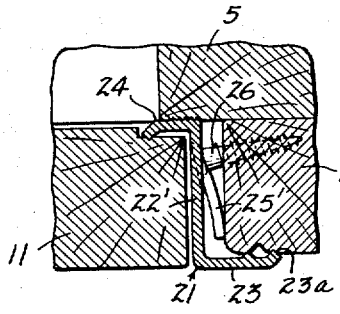
Fig. 3a is a section similar to that in Fig. 3 showing the identical sash and adaptor frame of Fig. 3 mounted in a casing opening differing in size from the dimensions shown in Fig. 3.

As is apparent from inspection of Figs. 2, 3 and 3a, the outwardly extending flange 23 of the side and top bars of the adaptor frame 19 and the character of the rocker 27 make it possible to fit the adaptor frame to window casing structures which depart considerably (due to either careless fabrication, swelling, expansion or other cause) from the correct nominal dimensions of the casing structure. Thus the entire sash structure, adaptor frame and bottom adaptor and weather seal device can be manufactured complete to readily held dimensional limits by large scale production methods and the sashes when transported to the building for which they are supplied can be easily and rapidly mounted by an unskilled workman by the use merely of a hammer and a screw driver. At the same time, the relatively narrow exposed flange of the adaptor frame presents a pleasing appearance and the entire sash installation may be made to conform strictly to the architectural lines of the main window sash construction of the building. Thus the invention attains the highly desirable results of low cost large scale manufacture, low cost installation and pleasing appearance.

It will be appreciated that the sharp cornered or ribbed construction of the adaptor frame facilitates close engagement between the frame and the casing and between the frame and the sash with resultant effective sealing against the weather. The beveled form of the free edge of the frame flanges 23 contributes to this result. For when the window casing is painted (in the course of building upkeep) the angle between the bevel and the casing surface, as previously noted, causes paint to be drawn in and, in effect, calk the joint. Furthermore, the form of the adaptor frame and its arrangement in the casing are such that if any moisture finds entrance to the continuous space between the frame and the casing it can find free drainage to the window sill and out through clearance which may be provided between the bottom ends of the frame strips 21 and the sill. Rotting and deterioration of the casing structure is thus obviated.

Figure 9:
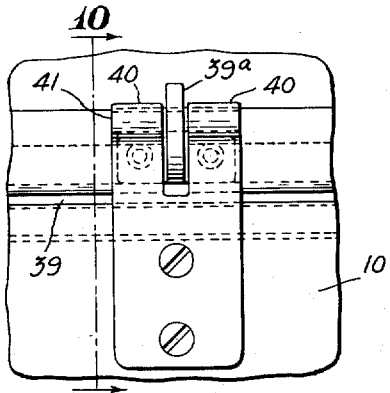
Fig. 9 is an enlarged fragmentary outside elevation illustrating a modified means for pivotally mounting the auxiliary sash structure.
Figure 10:
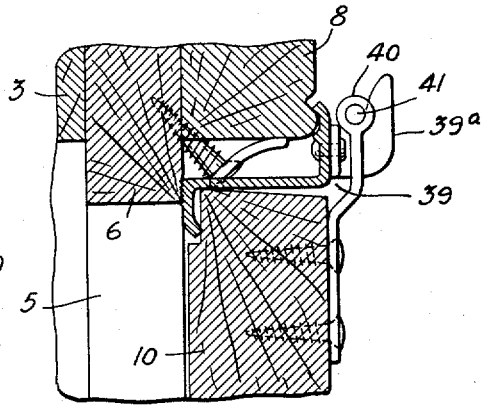
Fig. 10 is a section on the line 10—10 of Fig. 9.

It will readily be appreciated that the adaptor frame is susceptible of modification in a variety of ways in the practice of the invention. Thus in Figs. 9 and 10 is shown a modified form of adaptor frame in which the top or transverse strip 39 of such frame is fitted with hanger lugs 39a for cooperation with hanger brackets 40 attached to the top rail of the sash 10. Each of such hanger brackets 40 is bifurcated at its upper end to embrace the lug 39a and has a pin 41 to engage the inwardly inclined surface of the lug to support the sash 10 in firm engagement with the inner flange of strip 39 yet with freedom to swing outward to provide ventilation.

Figure 11:
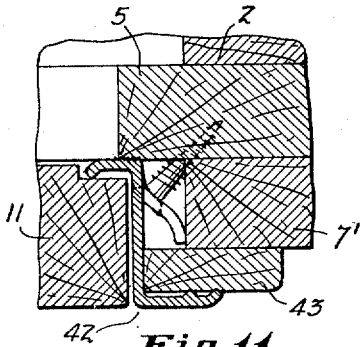
Fig. 11 is a horizontal section corresponding to Fig. 3 illustrating a slightly modified form of adaptor frame for use where the outside trim of the window casing departs from the trim of standard dimensions shown in Figs. 1 to 10.
Figure 12:
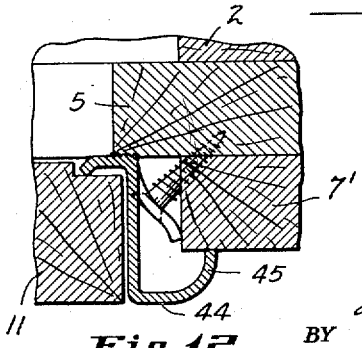
Fig. 12 is a view similar to Fig. 11 showing still another modification of the adaptor frame construction for use in connection with the same modified trim construction shown in Fig. 11.

Figs. 11 and 12 show slight modifications of the adaptor frame structure which may suitably be employed in connection with window casing structures having outside casing members 7' thinner than those shown in the forms of construction already described. Thus in Fig. 11 the adjustable lug portions of the adaptor frame strip 42 are made a little shorter than in the above described constructions so that the adaptor frame will accommodate a wood filler strip 43 between the member 7' and the flange of the adaptor frame.

Fig. 12 shows a modification for the same purpose but here the adaptor frame strips 44 have their outwardly turned flanges 45 elongated and curved backward to engage the thin window casing member 7'.

By the use of adaptor frames and bars of the type shown and described sash structures of exact standard size can be inserted, with complete success as to appearance and effective closure in window casing openings which vary from the standard size as much as ⅝" in width and ¾" in height.

It will be apparent that panel structures of various types and forms can be used with the novel adaptor frame and bar and can be attached to or mounted in the adaptor frame in various ways. Also it is obvious that the sill-mounted adaptor and weather seal can be used alone, i. e., independently of the adaptor frame, and in conjunction with practically any type of window sash that is movably mounted in a manner to actuate the adaptor when the sash is closed, as in the case of a casement window sash, for example. Furthermore, it is to be understood that the forms of construction shown can be varied substantially within the bounds of the invention as defined in the claims. The sill-mounted adaptor device is not separately claimed herein as it constitutes the subject of the applicants' continuation-in-part application Serial No. 256,302, filed November 14, 1951.

What is claimed is:

1. A panel closure means for cased openings of buildings of which the casing structure comprises upright, head, sill and blind stop parts, the said closure means comprising a panel structure substantially smaller in width and length than the opening formed by the upright, head and sill parts of a casing to be closed; an inverted U-shaped adaptor frame formed separately from the panel structure of metal bar stock of approximately Z-shaped cross section and having a web part fitting around the side and top edges of the panel structure, a plurality of bendable lugs extending outwardly from said web part of the frame to slidably engage and by bending conform to the inner sides of a casing structure to position the frame in the casing opening, a flange extending inwardly from the inner edge of the said web part to form a seat for the inner side of the panel and adapted to closely engage the blind stop of a casing structure, and a flange extending outwardly from the outer edge of the web to overlie the outer face of the upright and head parts of a casing structure more or less according to the size of the casing opening in order to cover the space between said parts and the edges of the panel; means for movably supporting the panel structure in the adaptor frame; and means for securing the adaptor frame to a casing structure.

2. As an article of manufacture, an inverted U-shaped adaptor frame for panel structures formed of metal bar stock of approximately Z-shaped cross section having a longitudinally extending web part disposed substantially at right angles to the plane of the frame, a continuous flange part extending outwardly from one edge of the web part, and a second continuous flange extending inwardly from the other edge of the web part, the top and sides of said frame having a plurality of bendable lugs extending outwardly at an inclination from the web part and transversely thereto toward the outwardly-extending flange.

3. An article of manufacture as claimed in claim 2 in which at least some of the lugs are apertured to receive attachment screws.

4. An article of manufacture as claimed in claim 2 in which the outwardly-turned flange has a sharp-edged longitudinally-extending rib facing toward the plane of the inwardly-turned flange while the latter has on one side at least one sharp-edged longitudinally-extending rib facing away from the plane of the outwardly-turned flange.

5. An article of manufacture as claimed in claim 4 in which the inwardly-turned flange has also a sharp-edged longitudinally-extending rib facing toward the plane of the outwardly-turned flange.

6. As an article of manufacture, a metal bar of approximately Z-shaped cross-section comprising a longitudinally-extending web part, two longitudinal flanges extending in opposite directions from the respective longitudinal edges of the web and substantially at right angles to the web and a longitudinally-extending series of bendable lugs formed integrally with the web and extending transversely of the bar at an inclination to the web and toward one of the flanges.

7. An article of manufacture as claimed in claim 6 in which the two flanges are formed on one side thereof with longitudinally-extending sharp-edged ribs facing in the same direction.

8. An article of manufacture as claimed in claim 7 in which one of the flanges is formed also with an oppositely-facing longitudinally-extending sharp-edged rib.

9. An article of manufacture as claimed in claim 6 in which at least some of the lugs are apertured to receive attachment screws.

10. The combination of a casing structure comprising upright, top, panel stop, and sill parts; a panel structure movably supported in the casing; adaptor means interposed between the bottom of the panel structure and the casing sill comprising an elongated metal angle bar having a transversely curved longitudinally-extending zone joining the two arm sections of the angle bar and adapted to roll on the top of the casing sill, the said zone having a plurality of attachment holes elongated transversely of the bar; and means extending through the attachment holes for loosely securing the angle bar to the sill with one arm of the bar extending upward to be engaged and moved by the inner face of the panel and its other arm extending outward to engage the bottom edge of the panel when the bar is moved by the panel.

*11. A panel closure means for cased openings of buildings of which the casing structure comprises upright, head, sill and blind stop parts, the said closure means comprising a panel structure substantially smaller in width and length than the opening formed by the upright, head and sill parts of a casing to be closed; an inverted U-shaped adaptor frame formed separately from the panel structure of metal bar stock of approximately Z-shaped cross section and having a web part fitting around the side and top edges of the panel structure, a flange extending inwardly from the inner edge of the said web part to form a seat for the inner side of the panel and adapted to closely engage the blind stop of a casing structure, and a flange extending outwardly from the outer edge of the web to overlie the outer face of the upright and head parts of a casing structure more or less according to the size of the casing opening in order to cover the space between said parts and the edges of the panel; means for movably supporting the panel structure in the adaptor frame; means for securing the adaptor frame to a casing structure; adaptor means to be interposed between the bottom of the panel structure and a casing sill comprising an elongated metal angle bar having a transversely curved longitudinally-extending zone joining the two arm sections of the angle bar and adapted to roll on the top of a casing sill, the said zone having a plurality of attachment holes elongated transversely of the bar; and means extending through the attachment holes for loosely securing the angle bar to a casing sill with one arm of the bar extending upward to be engaged and moved by the inner face of the panel and its other arm extending outward to engage the bottom edge of the panel when the bar is moved by the panel.*

*12. A sill-supported adaptor and weather seal for windows comprising an elongated metal angle bar having a transversely curved longitudinally-extending zone joining the two arm sections of the angle bar and adapted to roll on the top of a window casing sill, the said curved zone of the bar being pierced with a plurality of attachment holes each of which is elongated transversely of the bar.*

*13. A sill-supported adaptor and weather seal as claimed in claim 12 in which one arm of the bar has a greater width than the other arm.*

*14. A sill-supported adaptor and weather seal device as claimed in claim 12 having the free longitudinal edge part of one arm of the bar bent laterally in the direction in which the other arm thereof extends.*

*15. A sill-supported adaptor and weather seal device as claimed in claim 12 in which one arm of the angle bar is of lesser width than the other and has its free longitudinal edge part bent laterally in the direction in which the other arm of the bar extends.*

JOSEPH H. OSWALD.
FREDERICK G. OSWALD.

References Cited in the file of this patent or the original patent

UNITED STATES PATENTS

| Number | Name | Date |
|---|---|---|
| 608,759 | Daniels | Aug. 9, 1898 |
| 780,840 | Tracy | Jan. 24, 1905 |
| 809,990 | Shepherd | Jan. 16, 1906 |
| 1,379,862 | Goldsmith | May 31, 1921 |
| 1,727,953 | Baum | Sept. 10, 1929 |
| 1,808,413 | Hurley et al. | June 2, 1931 |
| 1,812,840 | Michaels | June 30, 1931 |
| 2,151,295 | Hucke | Mar. 21, 1939 |
| 2,156,964 | Biddle | May 2, 1939 |
| 2,219,594 | Lang | Oct. 29, 1940 |
| 2,234,533 | Nolan | Mar. 11, 1941 |
| 2,262,670 | Ensminger | Nov. 11, 1941 |
| 2,342,614 | Leacy | Feb. 22, 1944 |
| 2,344,877 | Janigian | Mar. 21, 1944 |
| 2,402,112 | Gee | June 11, 1946 |
| 2,430,615 | Levine | Nov. 11, 1947 |
| 2,504,701 | Krantz | Apr. 18, 1950 |

OTHER REFERENCES

Handbook of Aluminum Molding, page 19, Aluminum Co. of America, Pittsburgh, Pa.